July 26, 1966     A. H. SCHUTTE     3,262,573
FILTER APPARATUS

Filed Feb. 11, 1963     4 Sheets-Sheet 1

INVENTOR.
August H. Schutte
BY
Attorney

July 26, 1966     A. H. SCHUTTE     3,262,573
FILTER APPARATUS
Filed Feb. 11, 1963     4 Sheets-Sheet 2

INVENTOR.
August H. Schutte
BY
Attorney

July 26, 1966 A. H. SCHUTTE 3,262,573
FILTER APPARATUS

Filed Feb. 11, 1963 4 Sheets-Sheet 3

INVENTOR.
August H. Schutte
BY
Attorney

United States Patent Office 3,262,573
Patented July 26, 1966

3,262,573
FILTER APPARATUS
August H. Schutte, Lexington, Mass., assignor to Arthur D. Little, Inc., Cambridge, Mass., a corporation of Massachusetts
Filed Feb. 11, 1963, Ser. No. 257,697
3 Claims. (Cl. 210—380)

This invention relates to an apparatus for separating a two-phase system and more particularly to separating solids from a fluid whether the fluid is a liquid or a gas.

In industrial processes it is often necessary to clarify and filter solid particles from a fluid, i.e., a liquid or a gas, which has a low solids content. It also may be necessary to collect and concentrate product material in finely divided form. The collection of finely divided solids from a fluid system is normally carried out through the use of so-called thickeners or through various types of filtering mechanisms or filtering systems.

Thickeners are normally used in handling slurries which are thickened by settling, running off part of the supernatant liquid and carrying the slurry which is richer in solids to another station where it is again thickened by the process of settling. Such thickeners normally comprise a settler with means for the continued discharge of the thickened slurry, overflow of the clear water or thinner slurry and constant feed of the original slurry. It will be appreciated that such an apparatus requires intermittent shutdown for cleaning and removal of the particles which have been collected.

Likewise, there are many filtering devices which generally consist of a filtering surface, such as glass fabrics and the like, through which the fluid system carrying the solids is passed and the solids collected on the filter surface. Such devices are useful in the collection of dust, carbon black, soot, etc., and may have associated with them mechanisms for periodically cleaning so that they are, in effect, able to operate without any extended shutdown time. While many of the drawbacks of periodic shutdowns and inefficient filtration have been solved by prior art devices, there still remain serious problems not wholly solved, including for example, intermittent discharge rather than continuous discharge of the solids collected and very severe wear on the filter cloth by the rubbing action of the discharge removing mechanisms. Moreover, some of these filtering systems are not adaptable to handling dangerous or poisonous fluids.

It would therefore be desirable to have available apparatus which can efficiently and reliably remove extremely fine solid particles from a fluid system, i.e., from a liquid or a gas or a mixture of these. The apparatus of this invention achieves such efficient removal by employing a filter medium which rotates at a speed sufficient to continuously discharge solid materials which have approached or collected thereon through centrifugal force. Solids thus collected in the apparatus may be continuously or periodically removed without interrupting the filtering action of the apparatus.

It is therefore an object of this invention to provide an apparatus capable of removing solid particles from a fluid; the apparatus being reliable, relatively simple to operate, and not requiring periodic shutdown to remove the solids thus collected. It is a further object to provide apparatus of the character described which does not use intricate devices to continuously remove the solids collected or which because of their action are destructive to the filter media itself. It is yet another object to provide such apparatus which is equally well adaptable to removing finely divided solids from liquids or gases and which possess the characteristics of being flexible in operation and adaptable to various systems. It is still a further object of this invention to provide such apparatus which does not introduce hazards or discomforts in handling hazardous, poisonous or noxious fluids. Other objects of the invention will in part be obvious and will in part be apparent hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description, taken in connection with the accompanying drawings in which.

In the method of this invention, the solids-laden fluid (gas or liquid) is fed into a cylindrical vessel in which is mounted a rotating cylindrical assembly which serves as a filter. The solid particles are forced under the pressure of the approaching flow toward or against the filter and are then subsequently thrown away from the filter assembly by centrifugal force against the inner wall of the outer cylindrical vessel. Gravity carries them down for collection and removal.

Figure 1:
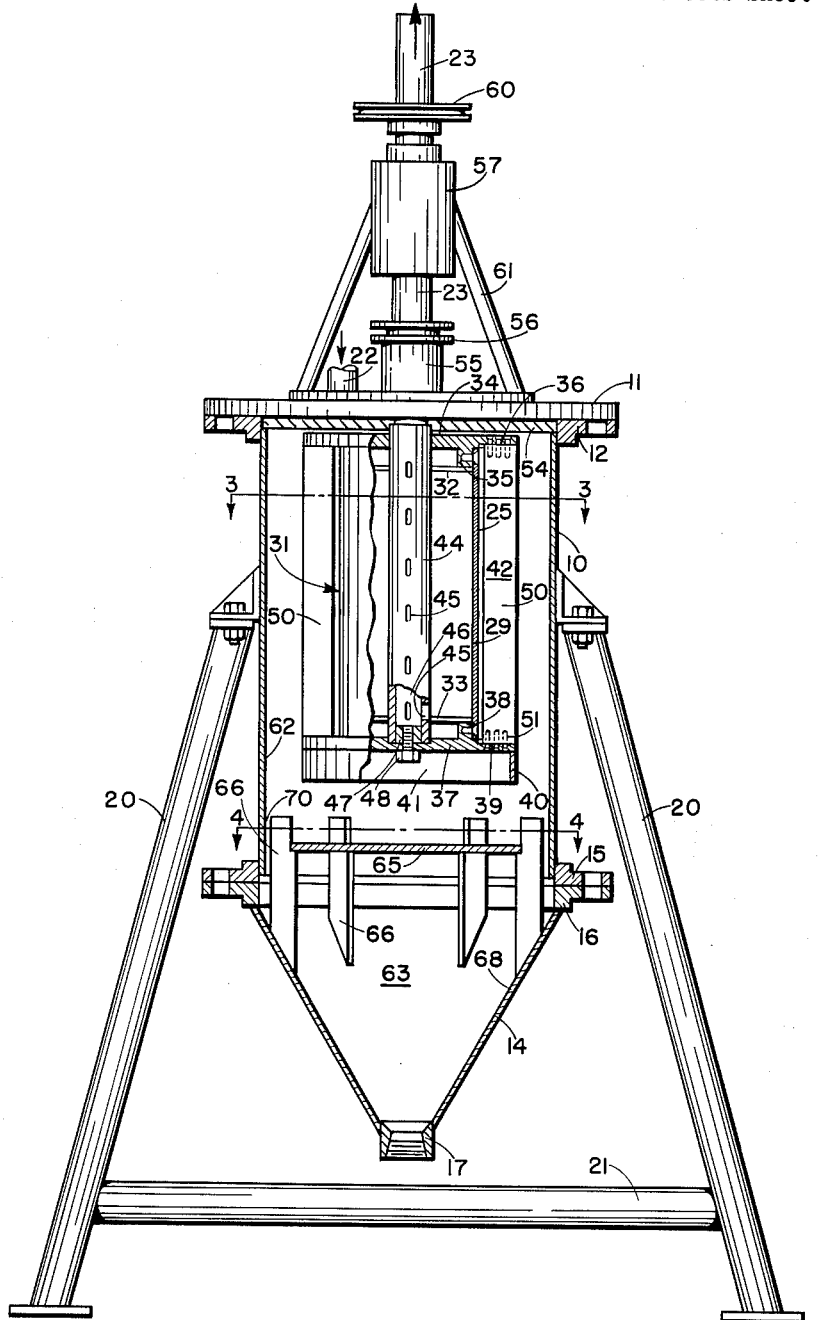
FIG. 1 is a side elevational view partially in cross-section of a liquid-solid separation apparatus constructed in accordance with this invention.
Figure 2:
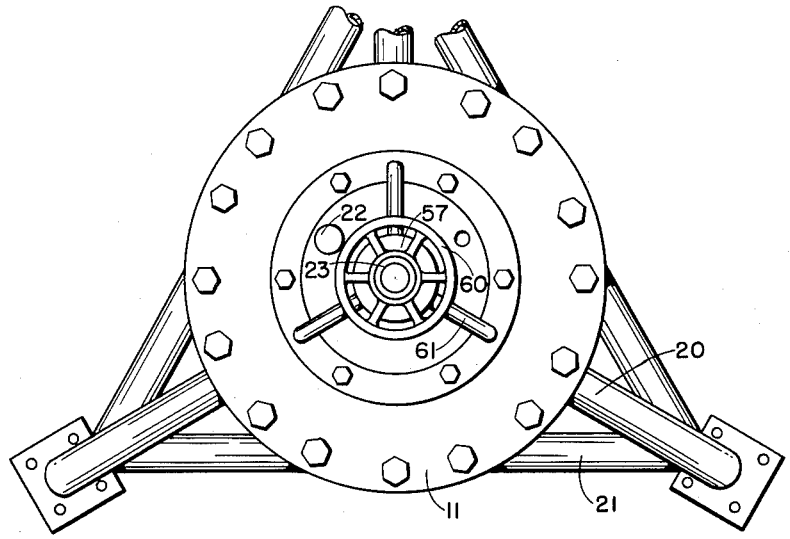
FIG. 2 is a top plan view of the apparatus of FIG. 1.

FIG. 1 is a side elevational view, partially in cross-section, of an embodiment of the apparatus of this invention, adapted to separate finely divided particles from a liquid. In the apparatus of FIG. 1 there is provided a cylindrical stationary vertical housing 10 which has a top 11 joined to the cylindrical housing 10 through the use of a slip-on flange 12. The bottom portion of the housing is a conical section 14 which, in turn, is also joined to the cylindrical vertical portion 10 through suitable slip-on flanges 15 and 16. The conical bottom section 14 terminates in a coupling means 17 for joining to any suitable discharge system. The entire stationary housing is supported by legs 20 and horizontal supports 21. It is equipped with an inlet conduit 22 and an outlet or discharge conduit 23.

Figure 5:
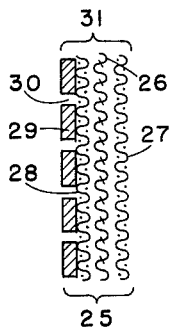
FIG. 5 is a cross-section of a fragmentary portion of a typical filter element of the apparatus of the invention.

Within the stationary cylindrical housing 10 is located a cylindrical rotating filter 25 which, as will be seen from an examination of FIG. 5, is formed of a combination of a filtering fabric 26 held between an outer protective screen 27 and an inner back draining screen 28. This rotating filter 25 is, in turn, supported on a filter support 29 having ports 30, a top 32 and a bottom 33. The entire rotating cylindrical assembly of the apparatus (designated by numeral 31) located within the stationary housing 10, is framed within a top plate 34 and a bottom plate 37. Top plate 34 has integral with it an annular ring support 35 and a peripheral extension 36. In like manner, the bottom plate 37 has associated and integral with it a bottom annular ring support 38 and a bottom peripheral extension 39. The bottom peripheral extension 39, in turn, has affixed to it an extension 40 which defines within it a zone 41, the purpose of which will be described below in the discussion of the operation of the apparatus.

As will be seen below in the description of the operation of the apparatus, the choice of the components (and particularly of the filtering fabric 26) of the rotating filter 25 and the speed at which the rotating cylindrical assembly 31 is operated determines the type of performance obtained from the apparatus. Thus it is possible to run with an essentially perfectly clean filter, with little or no contact between solids and filter surface, to collect fine particles on the filter, or to achieve solid particle size separation. For this reason, the solid particles may be described as approaching or contacting the filter surface, or being differentially separated by it.

Figure 3:
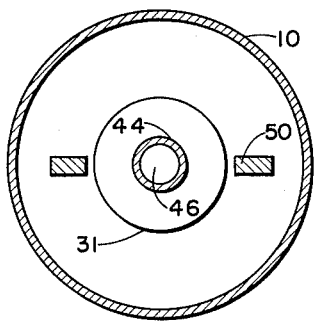
FIG. 3 is a cross-sectional view along lines 3—3 of FIG. 1.

Within the volume 42, defined by the filtering cylinder assembly 31, is a hollow shaft 44 which has ports 45. The hollow shaft 44 defines a discharge passage 46 which becomes integral with the discharge conduit 23. The shaft 44 has an end plug 47 through which the shaft is permanently affixed by means of a suitable screw 48 to the entire filtering assembly 31. Attached to the peripheral extensions 36 and 39 are vertical baffle plates 50. Such attachment is achieved through any suitable means such as screws 51. It will be seen from FIG. 3 that two such baffle plates 50 are provided and located at 180° to each other. The purpose of these baffle plates is to rotate the annular fluid and diminish the slip. Thus the fluid is kept in contact with the rotating assembly 31 without causing any appreciable axial thrust on it.

Attached to the housing top 11 is sealing plate 54 through which the shaft rotates and with which a fluid type seal is formed. A suitable seal 55 is provided external of the housing along with glands 56 and bearings 57. Shaft 44 is driven through a suitable drive pulley 60 by a motor not shown. The entire shaft is supported externally above the housing by suitable shaft supports such as 61.

Figure 4:
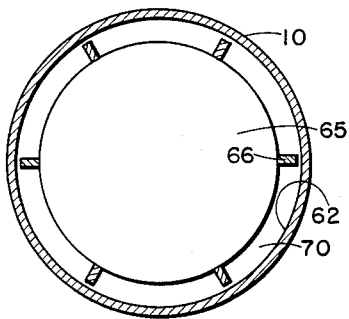
FIG. 4 is a cross-sectional view along lines 4—4 of FIG. 1.

In the operation of the filtering apparatus of this invention the solid particles or heavy slurries which approach or contact the rotating filtering assembly 31 are thrown outwardly and are collected on the internal walls 62 of the stationary housing 10. It is, of course, necessary to provide means for collecting the solid particles or heavy slurries and for directing them to the collection zone as defined by the conical bottom section 14. It is, moreover, desirable in the collection of these materials to establish within zone 63, which is defined by the wall 68 of the conical bottom section 14, a quiet area in which the materials to be collected may flow downwardly for removal through the outlet coupling 17. In order to accomplish this, a horizontal baffle plate 65 is located just above the juncture of the stationary housing 10 and the conical bottom section 14. The baffle plate 65 is equipped with vertically positioned baffles 66. In FIG. 4 it will be seen that six such baffle plates 66 have been provided and in FIG. 1 it is shown how these vertical baffle plates are attached to the wall 68 of the conical bottom section 14. The baffle plates 66 define between the horizontal baffle plate 65 and the internal wall 68 passageways 70 through which the slurry or the solid particles may be directed to the quiet zone 63. By providing zone 41 under the rotating assembly, it is also possible to materially reduce the turbulence in the area defined between the bottom of the rotating assembly 31 and the horizontal baffle plate 65.

Figure 6:
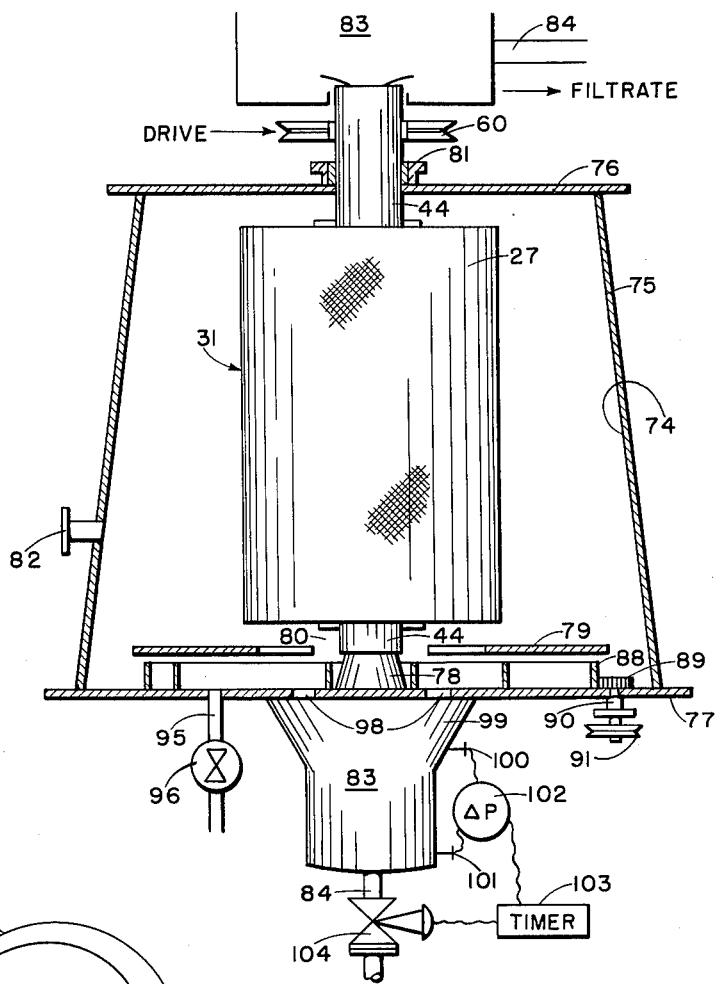
FIG. 6 is a side elevational view partially in cross-section of a modification of the apparatus of this invention.
Figure 7:
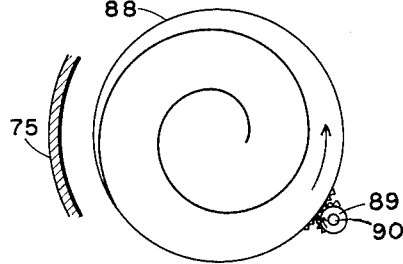
FIG. 7 is a top plan view of a spiral-scroll solids removing apparatus.

FIG. 6 illustrates a modification of the apparatus of this invention adapted, as in the case of the apparatus of FIG. 1, to separating solids from liquids. Like numbers refer to like elements in FIG. 1. In the apparatus of FIG. 6 the stationary housing 75 assumes a conical configuration which in some cases facilitates the flow of the solid particles or slurry down the internal wall 74 of the housing. This pressure vessel is equipped with a top 76 and bottom 77. As in the case of the apparatus in FIG. 1 there is provided a hollow shaft 44 which in FIG. 6 is seen to rest upon a suitable support 78. Seals and glands 81 and driving member 60 complete the shaft assembly which is similar in design and construction to that shown in FIG. 1. An inlet 82 is provided to introduce the feed in the bottom portion of the conical stationary housing 75. A collection means 83 is provided at the discharge end, and it is associated with an outlet conduit 84 whereby the solids or heavy slurry are removed from the system. Baffles 79 located between the rotating filter assembly 26 and the bottom 77 form a quiet zone 80 for the collection of the heavy slurry or the solid matter which is to be removed from the liquid. In order to assist in the collection and the removal of the heavy slurry or the solids, there is also provided a spiral scroll 88 (FIG. 7) which is revolved within the housing 75 through a suitable driving system shown in FIG. 6 as a gear train 89, a shaft 90 and driving means 91.

The apparatus in FIG. 6 also provides for the introduction of additional wash liquid by means of a wash inlet 95 which is controlled by valve 96. Outlet ports 98 permit the collected slurry or solid matter to be introduced into the collector 83. Collector 83, in turn, is equipped with a differential pressure guage 102 designed to detect differences in pressure at two levels of the collector 83, such as at upper level 100 and lower level 101. The pressure guage 102, in turn, is connected through suitable circuitry to a timer 103 which is adapted through appropriate circuitry to actuate a valve 104 located within outlet conduit 84. Thus means are provided to periodically and automatically discharge the solids collected.

Figure 8:
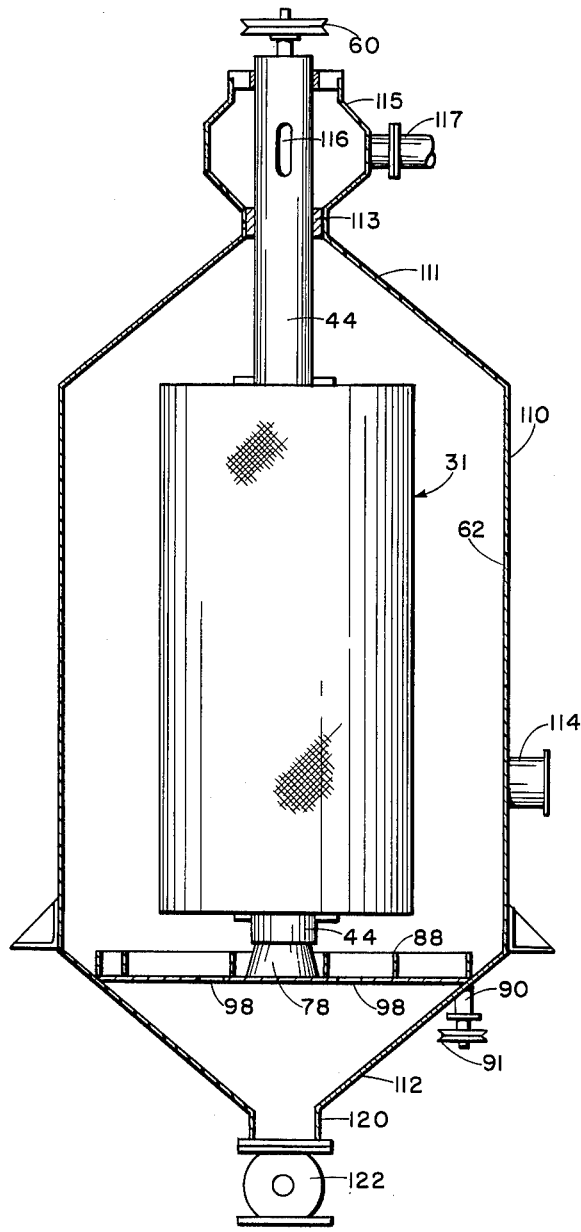
FIG. 8 is another modification of the apparatus of this invention showing a gas-solid separator.

FIG. 8 illustrates another modification of the apparatus of this invention designed to remove finely divided solid particles from a gas stream fed in through inlet 114. In this figure, like elements are identified by like reference numbers used in FIG. 1. The stationary housing of the apparatus of FIG. 8 is made up of a cylindrical portion 110, a top conical portion 111 and a bottom conical portion 112. Shaft 44, constructed as in the apparatus of FIG. 1, is introduced through the main stationary housing through a suitable sealing means 113. A gas collector 115 is provided, and the solids-free gas is forced out of rotating shaft 44 through ports 116 and removed from the system through a suitable conduit 117. Associated with the bottom conical portion 112 is an outlet neck 120 which, in turn, is connected to a rotary feeder 122 for removing the solids continuously or when desired.

In the operation of any modification of the apparatus (shown in FIGS. 1, 6 and 8) the fluid containing the solids to be removed is fed into the stationary housing through the inlet conduit indicated. The rotating cylindrical filter assembly 31 is rotated by means of hollow shaft 44. As explained in connection with FIGS. 1 and 5, the rotating filtering cylinder is foraminous in that it is formed of a filtering fabric or other suitable foraminous material which is protected on its outer surface by a screen and held spaced away from the support such as by another screen. This arrangement provides a fluid path into the hollow shaft 44 while affording a filtering surface for removing the solid particles from the fluid. Any solid particles will tend to be forced toward or against the rotating filter system by the approach flow of the fluid. Thus, for example in FIG. 1 a liquid containing solids is brought under pressure into the vessel 10 and is forced in the direction of the surface of the rotating filter assembly 31. Likewise, in FIGS. 6 and 8 the liquid or gas containing the solid matter will be introduced through conduits 82 or 114 and under pressure the solid material will be forced toward or against the filter.

That the fine particles in the liquid or gas can be thrown from the vicinity of the filtering system against the internal walls, i.e., walls 62 and 74 of FIGS. 1 and 6 can be shown in the following theoretical presentation. For fine particles in a fluid the terminal setting velocity is equal to $D^2 \rho s/10^4$, where D is the particle diameter in microns of the solid particles and $\rho s$ is the effective density of the particles. The effect of centrifugal force is to it increase $\rho s$. For example, for a 10 micron particle having a $\rho s$ of 4.0, the terminal settling velocity in air is 0.040 foot/second. If this particle were on the outside of a 48-inch diameter drum, rotating at 200 r.p.m., it would be subjected to 20 g's and so it could move off against any gas approach velocity less than $20 \times 0.04$ foot/second, or 0.8 foot/second. This approach velocity would limit the gas capacity of the device. By making the drum, for example, 60 inches long the surface area of the filter would be 63 square feet and the maximum gas flow would be 170,000 cubic feet/hour. This is a very considerable capacity for a device of this size compared with present-day filtering apparatus.

The gas surrounding the rotating cylinder will also rotate due to windage and drag. The solid particles thrown off of the filter medium will be thrown out to the wall of the vessel encountering lower and lower gas approach velocity as it moves radially. The net result of these effects is that the solid particles will spiral down inside the wall of the outside vessel and collect where they can be removed either by gravity flow as in FIG. 1 or by the spiral scraper shown in FIGS. 6 and 8. Extremely fine particles may eventually accumulate on the filter, but these may be removed by monentarily interrupting the gas flow. This reduces the gas approach velocity to zero.

The basic principle is also applicable to separating solids from a liquid. For example, at a centrifugal force of 20 g's (using a 24-inch diameter rotating filter at 250 r.p.m.) a particle having a settling velocity in a liquid of 1/200 of a foot/second would move off the filter medium against a filtrate velocity of nearly 1/10 a foot/second. A filter drum 2 feet in diameter by 4 feet long having an area of 25.2 square feet could handle about 110 gallons/minute of filtrate. It will be appreciated that the above figures are merely illustrative and are not limiting. They do, however, show that efficient separation of finely solid particles is possible in the apparatus described.

The method and apparatus of this invention offer a flexibility in operation heretofore not generally possible. It is in fact possible to choose operational and design parameters to accomplish one of at least three different results, i.e., removal of all of the solid particles, collection of the fine particles on the filter, or classification of the particles by size. The first of these is the essentially complete removal of all solid materials from the fluid while maintaining the rotating filter essentially free from any solids buildup on its outer surface. This is accomplished by rotating the filter assembly at a speed sufficient to hurl all of the solid particles, by means of centrifugal force, back through the approaching fluid stream and against the housing wall. In this case, the size of the foramens making up the foraminous filter surface does not have to be as small or smaller than the solid particles to be separated from the fluid. In fact, using an experimental apparatus constructed as shown in FIG. 1 it was found possible to separate over 95% of solid particles averaging 20 microns in size from a liquid stream using a filtering fabric (fabric 26 of FIG. 5) which had foramens or spacings measuring 150 microns.

In order to get a better picture of the factors affecting the operation of the device, it is helpful to consider the conditions prevailing near the filter wall and also in the annular column of liquid between the filter wall and the stationary housing.

If the device is operated without the baffles 50 (FIG. 1), there will be considerable slip between the rotating cylinder and the fluid annulus. As a matter of fact, it has been observed that the fluid in the annulus rotates rather slowly—particularly when there is a build-up of solids in the fluid. A high percentage of solids makes the fluid behave as if it had a viscosity much greater than its actual viscosity.

When filtration is in progress, the passage of filtrate through the wall of the rotating cylinder produces a boundary layer on this cylinder which is thin and nonturbulent. Solid particles smaller than the openings in the filter medium are rejected, due to the angle of approach of the fluid slurry. The rotational speed and the thickness of the boundary layer set the effective porosity of the filter medium. This is a well-known effect and is described in quantitative fashion by Gaudin in his "Principles of Mineral Dressing" (1939), page 151. He shows that a particle one-half the size of the opening in the filter medium has only a 1 percent chance of passing through with an angle of approach of 30 degrees—at an angle of approach of 15 degrees, the chance is essentially zero for even very fine particles. In the case of the filtering apparatus of this invention, the angle of approach depends upon the rotational speed of the filtering cylinder, the approach velocity of the fluid (a function of the filtration rate) and the thickness of the boundary layer.

When operating without the baffles 50, any particles reaching the filter medium would usually be small enough to pass through—unless a very fine filter medium is used. This type of operation may be desirable when handling fibrous materials but would not be suitable where a high retention of very fine particles (2–10 microns) is desired.

When operating with the baffles or vanes 50, the slip between the rotating filter cylinder and the annular column of fluid is greatly reduced. The boundary layer is much thicker but is probably still largely nonturbulent because of the passage of the filtrate through the wall. By spacing the vanes at a small distance away from the filter wall, some slip is obtained to keep the filter medium from plugging. There should be less solids in the annulus and therefore a much more rapid settling of solid particles. Only the finer particles approach the filter medium and the centrifugal setting is undisturbed by local high velocity zones because of the uniform fluid drawoff through the filter medium.

It has been observed that by gradually increasing the filtration rate and therefore the approach velocity of the fluid, a critical velocity can be reached where the filter medium can be precoated and that the precoated thickness can be maintained as long as the operating conditions are constant. It has also been found possible to repulp and redeposit the precoat by interrupting the filtrate flow momentarily. In other words, the precoat material is thrown off as soon as it is robbed of support by the inflowing fluid and is immediately redeposited as soon as the fluid flow is re-established.

From the above, it will be observed that the control of the relative rotation of the filter cylinder and of the annular fluid is of great importance. By varying the degree of slip, the device may be adapted to carry out clarification or classification at very high fluid rates per unit area or to carry out filtration operations employing a thin layer of cake or of precoat material for separation of fine particle-size material.

Thus the characteristics of the filter as well as the operating speed of the rotating assembly will depend upon the results desired and the predetermination of these parameters is within the ability of one skilled in the art.

In the operation of the apparatus of this invention there will normally be a continuous flow of solid particles or heavy slurry down the internal walls of the main cylindrical housing or pressurized vessel. Some provision must of course be made for removing these materials and this may be done intermittently or continuously, with or without automatic controls. FIG. 1 illustrates apparatus in which the material flows by gravity into the apex of a conical section from where it may be removed intermittently by opening the valve to allow the solid material or heavy slurry to flow out. In the apparatus of FIG. 6 the scroll-shaped scrapers continuously force the material to be removed into the collection means 83 through the ports 98. With the establishment of a sufficient pressure differential, the timer 103 actuates the valve 104 and discharges the slurry or solid particles. Finally, in FIG. 8 a modification is shown wherein the solid particles are continuously discharged through the rotary feeder 122.

The use of a countercurrent wash device is shown in FIG. 6. In the operation of this apparatus wash liquid may be introduced through conduit 95 so that it flows back through the scroll against the solids or heavy slurry collecting on the bottom of the vessel. The scroll-shaped scraper then directs the slurry formed of the solids and wash liquid down into the collection means. By this arrangement it is possible to obtain an efficient displacement wash to minimize the mother liquor content of the discharged solids. Thus, the apparatus of this invention is particularly well adapted to the clarification and filtration of low solids content slurries, replacing the well known thickeners of conventional filters. This apparatus has, in fact, built into it a self-cleaning feature which is valuable in handling solids which tend to plug a filter media. In the operation of the apparatus used either as a gas-solid or liquid solid separator, it is possible to momentarily interrupt the feed if any fine particles tend to slowly accumulate on the filter, or when the filter is purposely operated to collect particles on the filter surface.

It will be appreciated that various combinations of the apparatus elements shown are possible and are within the scope of this invention. Thus any of the collection and discharge means may be used with the various apparatus embodiments shown in FIGS. 1, 6 and 8 and washing means may be used with the apparatus of FIGS. 1 and 8.

In the operation of apparatus constructed in accordance with the teaching of this invention, the rotational speed of the rotating filter assembly, the rate at which the fluid is fed in and discharged, as well as the size of the filter system, will of course be determined by the character of the feed which is to be freed of solids, the size of the solid particles which are to be removed, and the final results desired. Thus, the operational parameters for any one system may be readily determined. The choice of materials from which the apparatus is constructed will be in keeping with good engineering practice, and will of course be selected to meet the demands of strength, resistance to corrosion under the operational conditions used, and the like. Filtering media other than fabrics and screens may be used provided they meet operational requirements.

It will be seen from the above description of the process and operation of this invention that there is provided an efficient filtering system which is capable of handling various filtering problems. Moreover, the apparatus is flexible in that it is capable of application to either gases or liquids containing small percentages of very fine solid particles, as well as to solid particle size separation. The apparatus is also efficient to operate and is reliable in that it is easily cleaned if necessary. In addition, it possesses the attractive feature of being able to discharge the solids or heavy slurries from the apparatus during operation so that periodic shut-downs are not normally required.

It will thus be seen that the objects set forth above, among those made apparent from the preceding description, are efficiently obtained and, since certain changes may be made in carrying out the above method and in the construction set forth without departing from the scope of the invention, it is intended that all matter contained in the above description and shown in the accompanying drawings shall be interpreted as illustrative and not in a limiting sense.

I claim:
1. An apparatus for removing solid particles from a fluid, comprising in combination
   (a) a pressure-tight stationary cylindrical housing having a stationary inner wall;
   (b) a rotatable cylindrical filter assembly mounted on a vertical axis within said housing and defining with the inner wall of said housing an annulus adapted through its configuration to control the flow and motion of said solid particles in said fluid in said annulus, said filter assembly comprising an outer foraminous cylindrical filter member mounted on and spaced from an inner hollow perforate shaft in fluid communication with a discharge conduit for filtered fluid passing through said filter member;
   (c) at least two vertically-positioned baffle plates mounted on said filter assembly, rotatable therewith and uniformly spaced around and away from said filter member, said baffle plates being also spaced from said inner wall of said housing and located in said annulus, whereby said baffle plates cause said fluid in said annulus to rotate and diminish the slip between said liquid in said annulus and said rotating filter assembly, thereby maintaining the radial separation forces;
   (d) fluid inlet means in fluid communication with said annulus;
   (e) means external of said housing for rotating said shaft, said filter assembly and said baffle plates thereby to impart to said fluid in said annulus in the vicinity of said rotating filter assembly a predetermined angular velocity; and
   (f) means for removing accumulated solids from said housing.

2. An apparatus in accordance with claim 1 further characterized as having means for minimizing fluid turbulence in said housing in the region below said rotating filter assembly.

3. An apparatus in accordance with claim 1 including means for introducing a wash liquid into said housing to contact the solids prior to their discharge.

References Cited by the Examiner

UNITED STATES PATENTS

| | | |
|---|---|---|
| 1,219,796 | 3/1917 | Atkins et al. |
| 1,269,067 | 6/1918 | Enell. |
| 1,624,831 | 4/1927 | Geddes _____ 210—112 X |
| 1,666,515 | 4/1928 | Sweetland _____ 210—528 X |
| 1,668,063 | 5/1928 | Force _____ 210—528 X |
| 2,197,509 | 4/1940 | Reilly et al _____ 210—297 |
| 2,223,701 | 12/1940 | Olson et al. _____ 210—113 |
| 2,442,234 | 5/1948 | Dunmire. |
| 2,678,133 | 5/1954 | Thayer et al. |

REUBEN FRIEDMAN, *Primary Examiner.*

D. M. RIESS, *Assistant Examiner.*